H. LAVAL.
CAPSULE FILLER.
APPLICATION FILED MAY 3, 1909.
992,886.
Patented May 23, 1911.
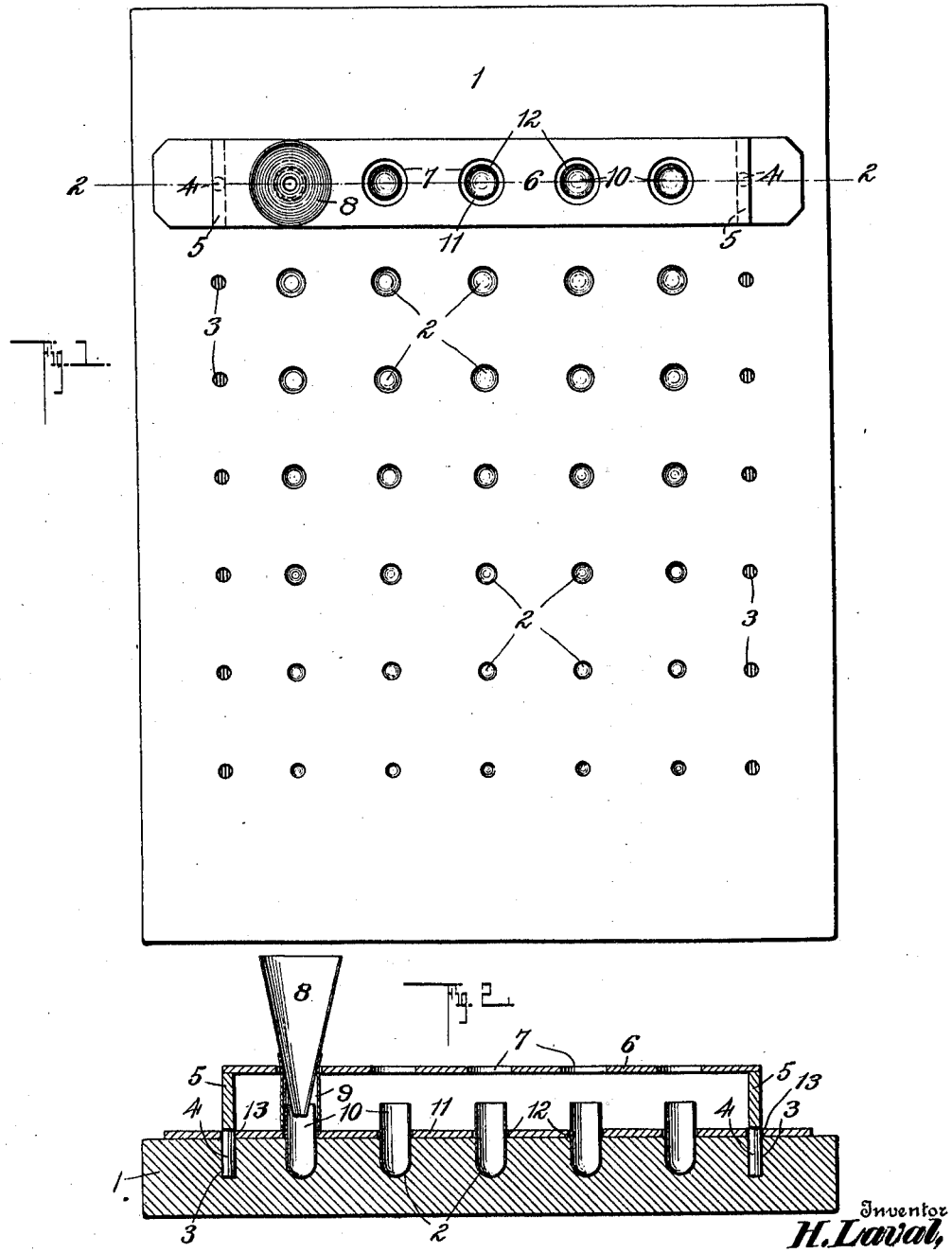

UNITED STATES PATENT OFFICE.

HENRY LAVAL, OF EVANSVILLE, INDIANA.

CAPSULE-FILLER.

992,886.  Specification of Letters Patent.  Patented May 23, 1911.

Application filed May 3, 1909. Serial No. 493,624.

*To all whom it may concern:*

Be it known that I, HENRY LAVAL, a citizen of the United States, residing at Evansville, in the county of Vanderburg and State of Indiana, have invented a new and useful Improvement in Capsule-Fillers, of which the following is a specification.

This invention relates to a capsule filler.

The object of the invention is a device for supporting a plurality of capsules in position to be readily filled.

The invention consists of the novel features of construction hereinafter fully described, pointed out in the claim and shown in the accompanying drawings, in which, Figure 1 is a plan view of the device. Fig. 2 is a section on the line 2—2 of Fig. 1.

The invention consists of a rectangular board 1 provided with a series of rows of circular recesses 2, said recesses receiving the capsules to be filled. These recesses are of a graduated size, in order that the board will accommodate capsules of various sizes, but it is of course understood that all of the recesses in a row run in one direction. These recesses are preferably of a depth equal to about one-half of the length of the capsule. Adjacent the sides of the board and at the ends of the rows of the recesses 2 are sockets 3 which receive pins 4, carried by supporting end pieces 5 of a plate 6, said plate being held by the end pieces above the board 1 and provided with openings 7 which register with the recesses 2 of the row above which the plate 6 may be placed, and which openings receive a funnel 8. This funnel is provided adjacent its lower end with a sleeve 9 into which the lower end of the funnel extends, and which sleeve fits snugly in the openings 7, and the sleeve also fits over the upwardly projecting portion of the capsules 10, the lower end of the funnel entering said capsules. The upper end of the capsules are therefore held between the lower end of the funnel 8 and the sleeve 9. To further aid in holding the capsules in position a board 11 is placed over the row of recesses containing the capsules to be filled, said board having suitable openings 12 which aline with the openings 7, and through which the capsule may project. The said board 12 is also provided with a suitable opening 13 adjacent each end through which the pins 4 project. By means of a device of this kind a number of capsules of the desired size can be slipped into position, and can be readily filled through the funnel 8 without danger of spilling any of the filling material, and without the hand touching the capsule while being filled.

What I claim is:—

In a device of the kind described, comprising a flat board having capsule receiving sockets in its surface, a flat plate adapted to be moved parallel to the surface of the board, and having openings therein of greater diameter than the said sockets, supporting pins carried by the end portions of said plate, and pin receiving sockets arranged in parallel rows and adjacent to the capsule receiving sockets.

HENRY LAVAL.

Witnesses:
STELLA CREIGHTON,
PHIL C. GOULD.

Copies of this patent may be obtained for five cents each, by addressing the "Commissioner of Patents, Washington, D. C."